UNITED STATES PATENT OFFICE.

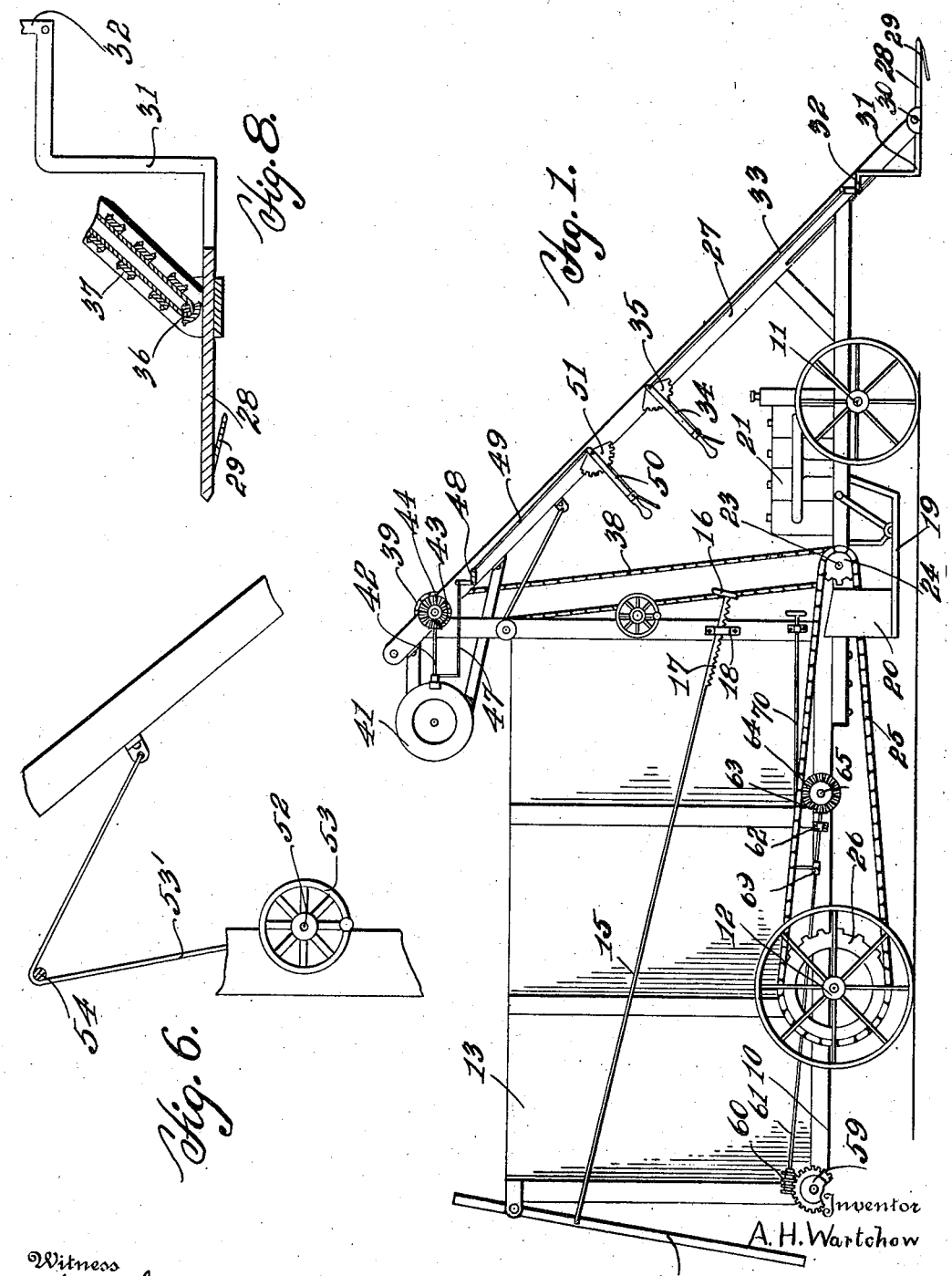

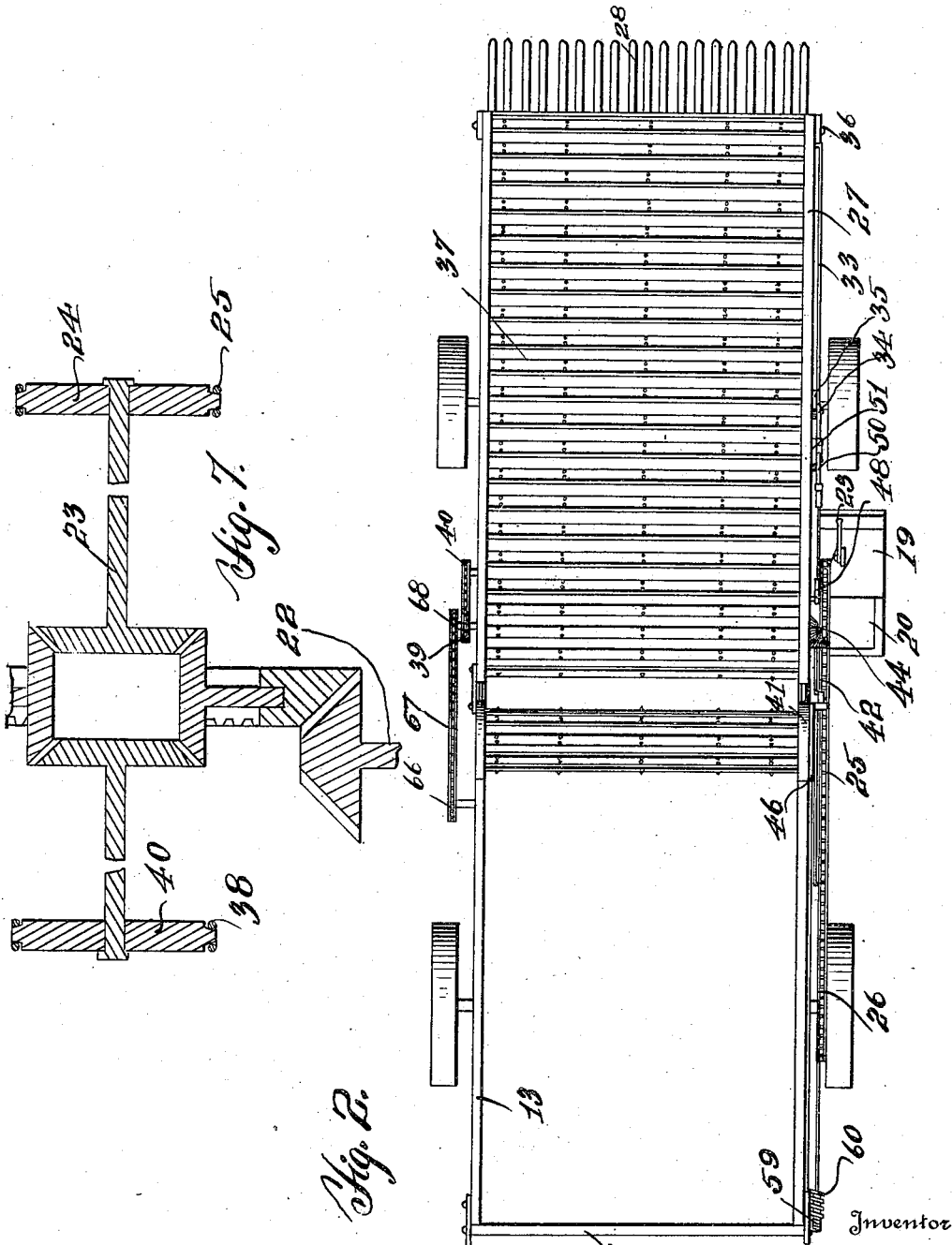

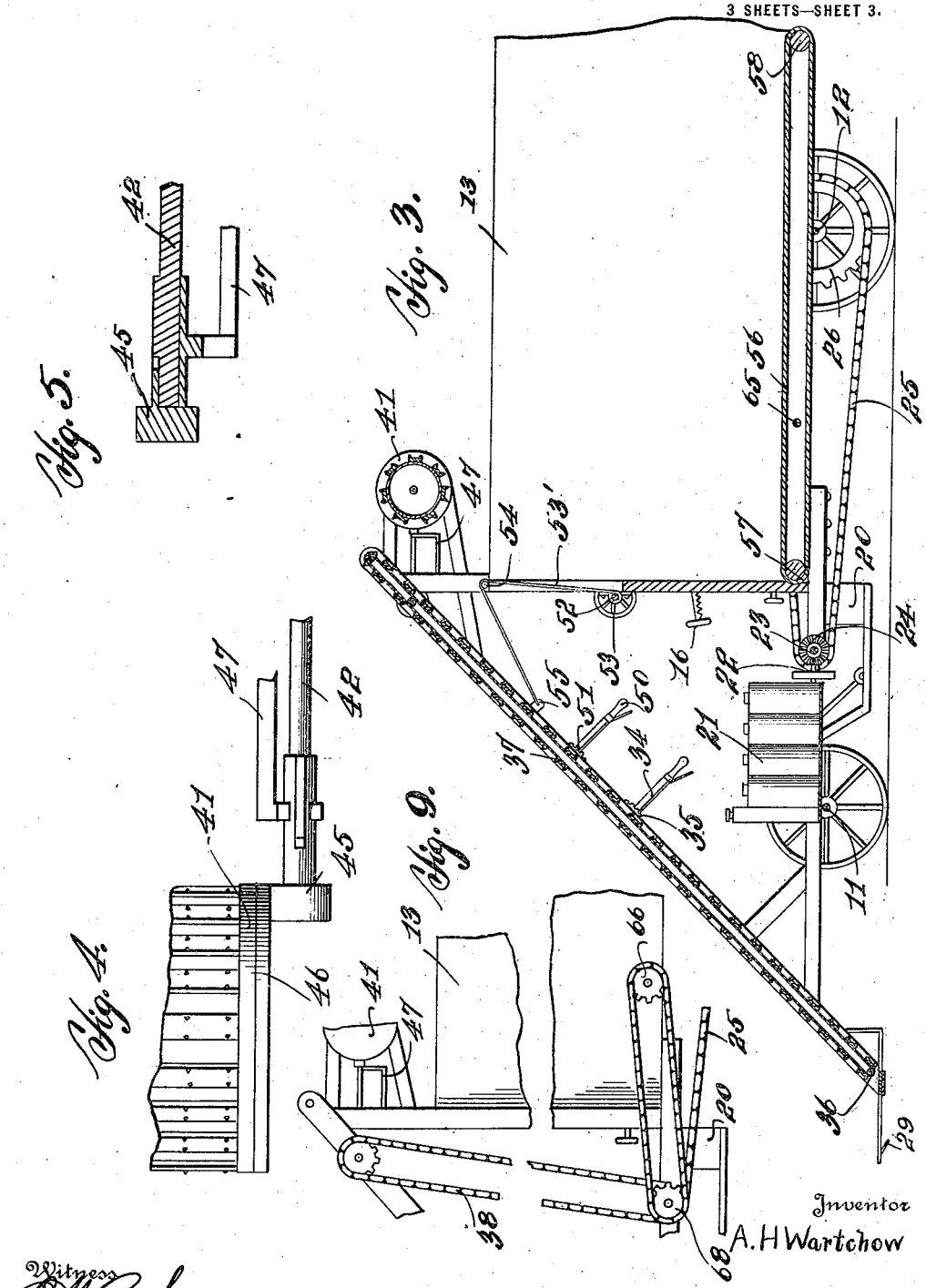

ALBERT H. WARTCHOW, OF DEERING, NORTH DAKOTA.

SHOCK-LOADING AND UNLOADING MACHINE.

1,250,737.  Specification of Letters Patent.  Patented Dec. 18, 1917.

Application filed July 2, 1917. Serial No. 178,189.

*To all whom it may concern:*

Be it known that I, ALBERT H. WARTCHOW, a citizen of the United States, residing at Deering, in the county of McHenry, State of North Dakota, have invented certain new and useful Improvements in Shock Loading and Unloading Machines; and I do hereby declare the following to be a full, clear, and exact description of the invention, such as will enable others skilled in the art to which it appertains to make and use the same.

This invention is an improvement in agricultural machines and has particular reference to a shock loading and unloading machine.

An object of the invention is to provide a machine for automatically gathering shocks of grain, hay and the like and depositing the same at different places in the body of the machine so that the latter is uniformly loaded as the operation of gathering the shocks progresses thus eliminating the necessity of additional labor to evenly distribute shocks in the body as the same is being filled.

Another object is to provide the body of the machine with a bottom in the form of an endless plate or apron connected to the drive shaft of the machine and controlled and actuated, at the will of the operator, to unload the shocks from the bottom after the same has been filled.

The inventive idea involved is capable of receiving a variety of mechanical expressions, one of which, for the purpose of illustrating the invention, is shown in the accompanying drawing, wherein:—

Figure 1 is an elevation looking at one side of the machine,

Fig. 2 is a top plan view,

Fig. 3 is a longitudinal section,

Fig. 4 is an enlarged detail view of the mechanism for changing the speed of the loading cylinder employed in connection with the invention, Fig. 5 is a sectional view thereof, Fig. 6 is an elevation of the adjusting device for the loading conveyer, Fig. 7 is a longitudinal section through the jack shaft of the machine, Fig. 8 is an enlarged detail of the lower end of the loading conveyer, Fig. 9 is a fragmentary side elevation looking at the side of the machine opposite that shown in Fig. 1.

In the drawings, the numeral 10 indicates the frame of a machine and 11 and 12 the front and rear wheel carrying axles, respectively. Supported upon the rear portion of the frame 10 is a body 13 having a pivoted rear end gate 14 to which is secured an operating rod 15 extending longitudinally of the body and provided upon its forward end with a handle 16 and a rack portion 17 adapted to engage the bracket 18 to retain the end gate in adjusted positions. The forward portion of the frame is provided with a platform 19 supporting the driver's seat 20 in such a position as to enable the operator to control the entire action of the machine.

The machine is preferably driven through an explosive engine 21 having the usual drive shaft 22 to which is connected the jack shaft 23 extending transversely of the frame. One end of the jack shaft carries a sprocket 24 around which the endless chain drive 25 extends, said chain drive also engaging a large sprocket 26 mounted upon the rear axle 12.

An endless conveyer frame 27, supported in an incline position, is slidably mounted upon the front portion of the frame 10 and the body 13 and has pivoted to its lower end the gathering teeth 28, the end teeth each having a rearwardly and downwardly extending spring 29 adapted for engagement with the ground and preventing the entrance of said teeth into the ground when traveling over rough surfaces thus avoiding damage to the teeth and other parts of the machine. The teeth are carried by a support 30 pivoted to the lower end of the frame 27 and having an arm 31 extending rearwardly therefrom to which is connected a bell crank lever 32 having secured to one of the arms thereof a rod 33 the other end of which is pivoted to an operating lever 34 having the segmental rack 35 coöperating therewith. By shifting the lever 34 it will be apparent that the support 30 may be rocked about its pivot and thus adjust the teeth vertically to operative and inoperative positions. Each end of the frame 27 is provided with a shaft 36 around which the endless loading conveyer 37 passes and which is driven by a chain 38 mounted upon the sprocket 39 carried by the upper shaft 36 and upon the sprocket 40 mounted upon the jack shaft 23.

Preferably supported at the upper end of the frame 27 is a rotatable loading cylinder or drum 41 operated through the medium of a shaft 42 having the gear 43 at one end meshing with a gear 44 carried by the end of the shaft 36 opposite the sprocket 39. This shaft 42 has adjustable longitudinally thereof a friction drive roller 45 adapted to engage the friction disk 46 carried by the cylinder 41 whereby the latter is rotated. It is proposed, in the present invention, to vary the speed of rotation of the cylinder 41 in order to automatically control the distribution of shocks into the body 13 from the conveyer 37 so that said body will be uniformly loaded and it will be apparent that by increasing the speed of the cylinder 41 the shocks will be thrown toward the rear end of the body 13 and by decreasing said speed the shocks will fall nearer the front end of the machine, the distance from said front end decreasing in proportion to the decrease in the speed of rotation of said cylinder. In order to vary this speed of rotation the friction roller 45 is connected to one end of a rod 47 the other end of which is connected to the bell crank lever 48 carried by the adjacent side of the frame 27, and pivoted to said bell crank lever is a rod or link 49 to which is connected the operating lever 50 pivoted to the side of the frame 27 and working over a rack segment 51. It will be seen from this description that by adjusting the lever 50 the roller 45 may be adjusted toward and away from the center of the friction disk 46 and thus increase and decrease the speed thereof.

Means are also provided for adjusting the conveyer frame 27 to an inoperative position when not in use and to this end use is preferably made of a transverse shaft 52 rotatably supported at the forward end of the body 13 and operated by a hand wheel 53 to wind and unwind the cables or other flexible elements 53' which pass around the pulleys 54 carried by the body 13 adjacent the upper end thereof, the ends of said cables being secured to the conveyer frame 27 at 55 and it will thus be seen by winding the cables 53' upon the shaft 52 the frame 27 and its associated parts will be slidingly adjusted upon the frame 10 and body 13 and thus elevate the lower end thereof from the ground.

The bottom of the body 13 is preferably formed by an endless apron or belt 56 rotatably mounted upon the forward and rear drums 57 and 58 respectively, the latter drum carrying a gear 59 meshing with a worm 60 supported by the shaft 61 rotatable in the bearings 62 carried by the frame 10 of the machine. The forward end of the shaft 61 is provided with a gear 63 meshing with a larger gear 64 carried by the shaft 65 journaled transversely of said frame 10 the end of the shaft 65 opposite that carrying the gear 64 being provided with a sprocket 66 around which passes a drive chain 67 which also engages a sprocket 68 carried upon the adjacent end of the jack shaft 23 so that as said shaft is rotated the power will be transmitted through the different parts just described to the rear drum 58 thus operating the apron 56. When loading the body 13 it is desirable that the apron 56 remain stationary and for this purpose the shaft 61 is preferably provided with a clutch 69 operable through the medium of a lever 70 pivoted to the frame 10 and arranged adjacent the driver's seat 20.

What is claimed is:—

1. A machine of the class described comprising a body, a loading conveyer associated therewith, a rotatable loading cylinder at one end of said conveyer, and means for varying the speed of rotation of said cylinder whereby to distribute shocks into different parts of said body.

2. A machine of the class described comprising a body, a loading conveyer associated therewith, a rotatable loading cylinder at one end of said conveyer, and a friction drive member engaging said cylinder for varying the speed of rotation thereof whereby to distribute shocks into different parts of said body.

3. A machine of the class described comprising a body, a loading conveyer associated therewith, a rotatable loading cylinder at one end of said conveyer, a friction disk carried by said cylinder, a shaft arranged adjacent thereto, means for driving said shaft, and a friction drive roller adjustable longitudinally of said shaft and toward and away from the center of said disk to vary the speed of rotation thereof whereby to distribute shocks into different parts of said body.

4. A machine of the class described comprising a body, a loading conveyer associated therewith, a rotatable loading cylinder at one end of said conveyer, a friction disk carried by said cylinder, a shaft arranged adjacent thereto, means for driving said shaft, a friction drive roller adjustable longitudinally of said shaft and toward and away from the center of said disk to vary the speed of rotation thereof whereby to distribute shocks into different parts of said body, and means supported by said conveyer and connected to said friction roller for adjusting the same.

In testimony whereof, I affix my signature in the presence of two witnesses.

ALBERT H. WARTCHOW.

Witnesses:
  A. I. ENGEBRETSON,
  L. J. WARKENTHIEN.